(12) United States Patent
Yanagi et al.

(10) Patent No.: US 10,271,160 B2
(45) Date of Patent: Apr. 23, 2019

(54) COMMUNICATION DEVICE AND COMMUNICATION SYSTEM

(71) Applicant: FUJITSU COMPONENT LIMITED, Tokyo (JP)

(72) Inventors: Masahiro Yanagi, Tokyo (JP); Kimihiro Maruyama, Tokyo (JP); Tatsuya Kakehashi, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 48 days.

(21) Appl. No.: 15/833,097

(22) Filed: Dec. 6, 2017

(65) Prior Publication Data

US 2018/0270604 A1 Sep. 20, 2018

(30) Foreign Application Priority Data

Mar. 14, 2017 (JP) .................................. 2017-048414

(51) Int. Cl.
*H04W 4/02* (2018.01)
*G01S 19/13* (2010.01)
*H04W 4/80* (2018.01)

(52) U.S. Cl.
CPC .............. *H04W 4/02* (2013.01); *G01S 19/13* (2013.01); *H04W 4/80* (2018.02)

(58) Field of Classification Search
CPC ............ H04W 4/02; H04W 4/80; G01S 19/13
See application file for complete search history.

(56) References Cited

U.S. PATENT DOCUMENTS

| | | | |
|---|---|---|---|
| 2012/0239291 A1* | 9/2012 | Do | G01S 5/0236 701/451 |
| 2012/0265439 A1 | 10/2012 | Radner | |
| 2013/0099971 A1 | 4/2013 | Takaoka | |
| 2013/0218950 A1 | 8/2013 | Sakakihara | |
| 2017/0273612 A1* | 9/2017 | Kim | G06Q 50/22 |

FOREIGN PATENT DOCUMENTS

| | | |
|---|---|---|
| JP | 2010-38798 | 2/2010 |
| JP | 2011-035438 | 2/2011 |

(Continued)

OTHER PUBLICATIONS

J-PlatPat English Abstract for JP 2015-28442, published Feb. 12, 2015.

(Continued)

*Primary Examiner* — Chuong A Ngo
(74) *Attorney, Agent, or Firm* — Staas & Halsey LLP (57) ABSTRACT

A communication device communicatable with an information processing device, including: a communicator that communicates with the information processing device; a detector that detects the movement of the communication device; an acquirer that acquires position information of the communication device by using one of different communication methods; and a selector that selects a communication method in which the acquirer acquires the position information, based on a selection signal transmitted from the information processing device; wherein when the detector detects the movement of the communication device, the communicator communicates with the information processing device, and the acquirer acquires the position information of the communication device by using the communication method selected by the selector.

5 Claims, 8 Drawing Sheets (56) References Cited

FOREIGN PATENT DOCUMENTS

| | | | |
|---|---|---|---|
| JP | 2011-69789 | 4/2011 | |
| JP | 2012-225900 | 11/2012 | |
| JP | 2013-88356 | 5/2013 | |
| JP | 2013-120131 | 6/2013 | |
| JP | 2013-172277 | 9/2013 | |
| JP | 2014-6090 | 1/2014 | |
| JP | 2015-28442 | 2/2015 | |
| WO | 2012/125966 | 9/2012 | |
| WO | 2014/123975 | 8/2014 | |
| WO | WO-2014123975 A2 * | 8/2014 | ............. G01S 19/34 |

OTHER PUBLICATIONS

J-PlatPat English Abstract for JP 2011-69789, published Apr. 7, 2011.
J-PlatPat English Abstract for JP 2013-120131, published Jun. 17, 2013.
J-PlatPat English Abstract for JP 2014-6090, published Jan. 16, 2014.
J-PlatPat English Abstract for JP 2013-88356, published May 13, 2013.
J-PlatPat English Abstract for JP 2010-38798, published Feb. 18, 2010.
J-PlatPat English Abstract for JP 2012-225900, published Nov. 15, 2012.
J-PlatPat English Abstract for JP 2013-172277, published Sep. 2, 2013.
Extended European Search Report for European Patent Application No. 17207799.2, dated May 17, 2018.
J-Plat Pat Abstract for JP 2011-035438, published Feb. 17, 2011.

* cited by examiner

| DATE AND TIME | PLANNED POSITION OF SLAVE DEVICE | SELECTION SIGNAL | CURRENT POSITION OF SLAVE DEVICE |
|---|---|---|---|
| Sep. 1 AM1 | HOME (INDOORS) | SLEEP | -- |
| Sep. 1 AM2 | | | |
| Sep. 1 AM3 | | | |
| Sep. 1 AM4 | | | |
| Sep. 1 AM5 | | | |
| Sep. 1 AM6 | | | |
| Sep. 1 AM7 | | | |
| Sep. 1 AM8 | OUTDOORS | GPS | -- |
| Sep. 1 AM9 | HOME (INDOORS) | BLUETOOTH | -- |
| Sep. 1 AM10 | | | |
| Sep. 1 AM11 | | | |
| Sep. 1 AM12 | | | |
| Sep. 1 PM1 | | | |
| Sep. 1 PM2 | | | |
| Sep. 1 PM3 | | | |
| Sep. 1 PM4 | | | |
| Sep. 1 PM5 | OUTDOORS | GPS | -- |
| Sep. 1 PM6 | HOME (INDOORS) | SLEEP | -- |
| Sep. 1 PM7 | | | |
| Sep. 1 PM8 | | | |
| Sep. 1 PM9 | | | |
| Sep. 1 PM10 | | | |
| Sep. 1 PM11 | | | |
| Sep. 1 PM12 | | | |

| DATE AND TIME | PLANNED POSITION OF SLAVE DEVICE | SELECTION SIGNAL | CURRENT POSITION OF SLAVE DEVICE | |
|---|---|---|---|---|
| Sep. 1 AM1 | HOME (INDOORS) | SLEEP | HOME (INDOORS) | ~200 |
| Sep. 1 AM2 | | | | |
| Sep. 1 AM3 | | | | |
| Sep. 1 AM4 | | | | |
| Sep. 1 AM5 | | | | |
| Sep. 1 AM6 | | | | |
| Sep. 1 AM7 | | | | |
| Sep. 1 AM8 | OUTDOORS | GPS | -- | |
| Sep. 1 AM9 | HOME (INDOORS) | BLUETOOTH | -- | |
| Sep. 1 AM10 | | | | |
| Sep. 1 AM11 | | | | |
| Sep. 1 AM12 | | | | |
| Sep. 1 PM1 | | | | |
| Sep. 1 PM2 | | | | |
| Sep. 1 PM3 | | | | |
| Sep. 1 PM4 | | | | |
| Sep. 1 PM5 | OUTDOORS | GPS | -- | |
| Sep. 1 PM6 | HOME (INDOORS) | SLEEP | -- | |
| Sep. 1 PM7 | | | | |
| Sep. 1 PM8 | | | | |
| Sep. 1 PM9 | | | | |
| Sep. 1 PM10 | | | | |
| Sep. 1 PM11 | | | | |
| Sep. 1 PM12 | | | | |

FIG. 6B

| DATE AND TIME | PLANNED POSITION OF SLAVE DEVICE | SELECTION SIGNAL | CURRENT POSITION OF SLAVE DEVICE | |
|---|---|---|---|---|
| Sep. 1 AM1 | HOME (INDOORS) | SLEEP | HOME (INDOORS) | ~200 |
| Sep. 1 AM2 | | | | |
| Sep. 1 AM3 | | | | |
| Sep. 1 AM4 | | | | |
| Sep. 1 AM5 | | | | |
| Sep. 1 AM6 | | | | |
| Sep. 1 AM7 | | | | |
| Sep. 1 AM8 | OUTDOORS | GPS | ARRIVE AT SCHOOL | |
| Sep. 1 AM9 | HOME (INDOORS) | BLUETOOTH | -- | |
| Sep. 1 AM10 | | | | |
| Sep. 1 AM11 | | | | |
| Sep. 1 AM12 | | | | |
| Sep. 1 PM1 | | | | |
| Sep. 1 PM2 | | | | |
| Sep. 1 PM3 | | | | |
| Sep. 1 PM4 | | | | |
| Sep. 1 PM5 | OUTDOORS | GPS | -- | |
| Sep. 1 PM6 | HOME (INDOORS) | SLEEP | -- | |
| Sep. 1 PM7 | | | | |
| Sep. 1 PM8 | | | | |
| Sep. 1 PM9 | | | | |
| Sep. 1 PM10 | | | | |
| Sep. 1 PM11 | | | | |
| Sep. 1 PM12 | | | | |

| PRIORITY ORDER | ACQUISITION MEANS | INDOORS/ OUTDOORS | COMMUNICATION DISTANCE |
|---|---|---|---|
| 1 | GPS UNIT | OUTDOORS | UNLIMITED IN OUTDOORS |
| 2 | SPECIFIED LOW POWER WIRELESS COMMUNICATOR | INDOORS | ~500m |
| 3 | WIRELESS LAN UNIT | | ~100m |
| 4 | IMES UNIT | | ~50m |
| 5 | BLUETOOTH UNIT | | ~10m |
| 6 | UWB UNIT | | ~10m |

COMMUNICATION DEVICE AND COMMUNICATION SYSTEM

CROSS-REFERENCE TO RELATED APPLICATION

This application is based upon and claims the benefit of priority of the prior Japanese Patent Application No. 2017-048414 filed on Mar. 14, 2017, the entire contents of which are incorporated herein by reference.

FIELD

A certain aspect of the embodiments is related to a communication device and a communication system.

BACKGROUND

There has been known a private wireless system that can confirm a position of a PHS terminal with high accuracy by using a GPS and can detect the position of the PHS terminal even when base station areas overlap with each other (see Patent Document 1: Japanese Laid-open Patent Publication No. 2015-28442). In the private wireless system, the position detection by the GPS is switched to a positioning system using a PHS wireless unit when it is detected by an acceleration sensor that a movement distance of the PHS terminal exceeds a position measurable range of the base station area.

There has been known a navigation system that can quickly and appropriately switch a positioning means by displaying a desired positioning means to be selectable at user's desired timing (see Patent Document 2: Japanese Laid-open Patent Publication No. 2011-69789).

There has been known a positioning device that detects a characteristic of the light irradiated to an electronic device, identify whether the electronic device is in the indoors or outdoors, and switches to any one of a position measured by an indoor positioning unit and a position measured by an outdoor positioning unit (see Patent Document 3: Japanese Laid-open Patent Publication No. 2013-120131).

SUMMARY

According to an aspect of the present invention, there is provided a communication device communicatable with an information processing device, including: a communicator that communicates with the information processing device; a detector that detects the movement of the communication device; an acquirer that acquires position information of the communication device by using one of different communication methods; and a selector that selects a communication method in which the acquirer acquires the position information, based on a selection signal transmitted from the information processing device; wherein when the detector detects the movement of the communication device, the communicator communicates with the information processing device, and the acquirer acquires the position information of the communication device by using the communication method selected by the selector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The device or system in Patent documents 1 to 3 is provided with a plurality of positioning means for acquiring position information. However, in order to switch to the positioning means to be used, it is necessary to always operate at least one of a microcomputer, a plurality of positioning means and various sensors, and therefore there is a problem that a power consumption of the device or system increases.

A description will now be given of an embodiment according to the present invention with reference to drawings.

Figure 1:
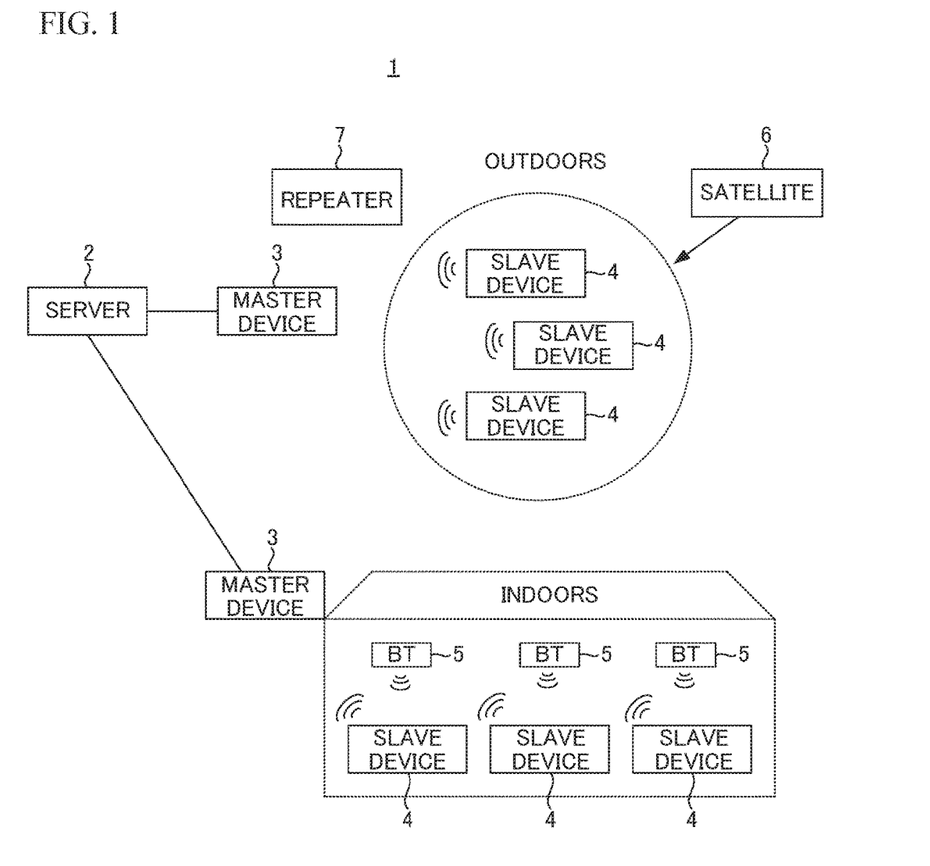
FIG. 1 is a configuration diagram of a communication system according to an embodiment.

FIG. 1 is a configuration diagram of a communication system according to an embodiment.

A communication system 1 according to an embodiment includes a server 2, master devices 3, slave devices 4, and Bluetooth transmitters (BT) 5. The master device 3 and the slave device 4 are communication devices that communicate with each other in a specified low power wireless communication of 920 MHz band. The master device 3 is connected to the server 2 by a cable or by radio. The slave device 4 acquires position information indicating a position of the slave device 4 based on a GPS (Global Positioning System) signal transmitted from a satellite 6 outdoors, and acquires position information based on a signal transmitted from the Bluetooth transmitter 5 indoors. When the position information is included in the signal from the Bluetooth transmitter 5, the slave device 4 acquires the position information from the signal. When the position information is not included in the signal transmitted from the Bluetooth transmitter 5, the slave device 4 acquires the position information in a three-point positioning method, for example. The slave device 4 calculates the position of the slave device 4 based on time differences between arrival times of respective signals transmitted from three Bluetooth transmitters 5 installed indoors. Alternatively, the slave device 4 calculates the position of the slave device 4 based on differences between reception intensities of the respective signals transmitted from three Bluetooth transmitters 5 installed indoors. The slave device 4 transmits the acquired position information to the server 2 via the master device 3.

Although the Bluetooth transmitter 5 is installed indoors in FIG. 1, for example, a transmitter for specified low power wireless communication, a transmitter for wireless LAN, a transmitter for IMES (Indoor MEssaging System), or a transmitter for UWB (Ultra Wide Band) may be installed indoors in addition to or in place of the Bluetooth transmitter 5.

Moreover, to deliver the signal from the slave device 4 to the master device 3, one or more repeater 7 may be provided between the slave device 4 and the master device 3.

Figure 2:
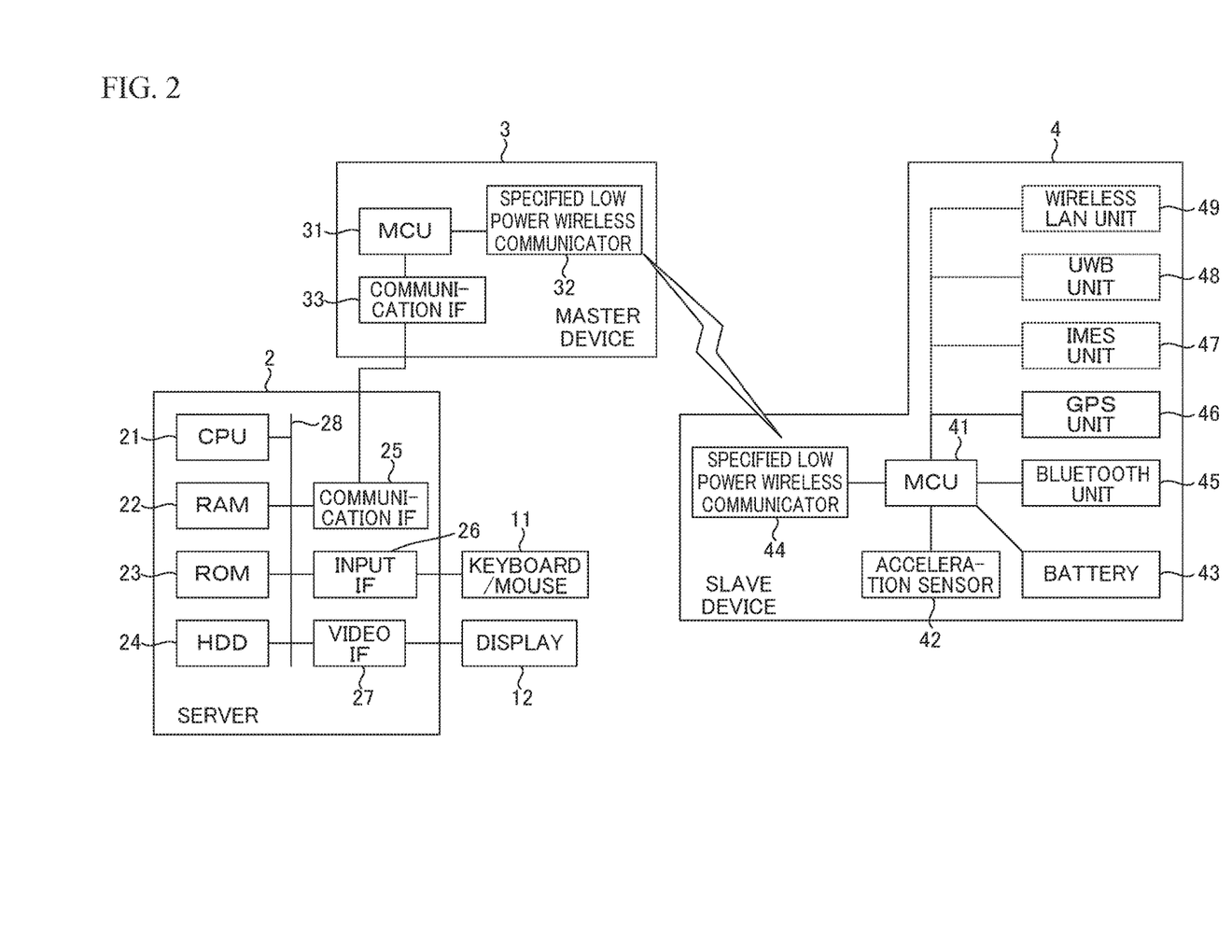
FIG. 2 is a configuration diagram of a server, a master device and a slave device.

FIG. 2 is a configuration diagram of the server 2, the master device 3 and the slave device 4.

The server 2 includes: a CPU 21 that controls the operation of the server 2; a RAM 22 that serves as a working memory; a ROM 23 and a HDD (Hard Disk Drive) 24 that store various data, programs and a database; a communication interface (IF) 25 that communicates with the master device 3 by a cable or by radio; an input interface (IF) 26 that inputs data from a keyboard/mouse 11; and a video interface (IF) 27 that outputs a video signal to a display 12. The CPU 21 is connected to the RAM 22, the ROM 23, the HDD 24, the communication IF 25, the input IF 26 and the video IF 27 via a bus 28. The CPU 21 serves as a transmission means.

The master device 3 relays the communication between the slave device 4 and the server 2. The master device 3 includes: a MCU (Micro Control Unit) 31 that controls the operation of the master device 3; a specified low power wireless communicator (hereinafter referred to as "wireless communicator") 32 that performs wireless communication with the slave device 4; and a communication interface (IF) 33 that communicates with the server 2 by a cable or by radio. The MCU 31 is connected to the wireless communicator 32 and the communication IF 33.

The slave device 4 includes: a MCU 41 that controls the operation of the slave device 4; an acceleration sensor 42 that detects the movement of the slave device 4; a battery 43, a specified low power wireless communicator (hereinafter referred to as "wireless communicator") 44 that performs wireless communication with the master device 3; a Bluetooth unit 45 that receives a signal transmitted from the Bluetooth transmitter 5; and a GPS unit 46 that receives a GPS signal transmitted from the satellite 6. In place of or in addition to the Bluetooth unit 45, the slave device 4 may include: an IMES unit 47 that receives a signal transmitted from the transmitter for IMES; a UWB unit 48 that receives a signal transmitted from the transmitter for UWB; and/or a wireless LAN unit 49 that receives a signal transmitted from the transmitter for wireless LAN. The MCU 41 is connected to the acceleration sensor 42, the battery 43, the wireless communicator 44, the Bluetooth unit 45, the GPS unit 46, the IMES unit 47, the UWB unit 48, and the wireless LAN unit 49.

The MCU 41 calculates the position of the slave device 4 based on the GPS signal received by the GPS unit 46 or the signal received by the Bluetooth unit 45, the IMES unit 47, the UWB unit 48 or the wireless LAN unit 49. The Bluetooth unit 45, the GPS unit 46, the IMES unit 47, the UWB unit 48 and the wireless LAN unit 49 serve as an acquisition means that acquires position information of the slave device 4. The MCU 41 serves as a selection means and a setting means.

The wireless communicator 44 not only performs the wireless communication with the master device 3, but also may receive the signal transmitted from the transmitter for specified low power wireless communication installed indoors. In this case, since the MCU 41 calculates the position of the slave device 4 based on the signal transmitted from the transmitter for specified low power wireless communication, the wireless communicator 44 also serves as the acquisition means that acquires position information of the slave device 4.

The acceleration sensor 42 serves as a detection means, and is a 3-axis, 6-axis or 9-axis acceleration sensor, for example. When the output of the acceleration sensor 42 exceeds a threshold value, i.e., the movement of the slave device 4 is detected, the MCU 41 switches an operation mode of oneself from a sleep mode (i.e., a second mode) to an active mode (i.e., a first mode). When the output of the acceleration sensor 42 does not exceed the threshold value for a given period, i.e., the movement of the slave device 4 is not detected, the MCU 41 switches the operation mode of oneself from the active mode to the sleep mode. In an initial state, the slave device 4 is the sleep mode in order to suppress the power consumption. In the active mode, a voltage from the battery 43 is supplied to the MCU 41, the acceleration sensor 42, the wireless communicator 44, the Bluetooth unit 45, the GPS unit 46, the IMES unit 47, the UWB unit 48, and the wireless LAN unit 49. On the contrary, in the sleep mode, the voltage from the battery 43 is supplied to only the MCU 41 and the acceleration sensor 42.

Figure 3:
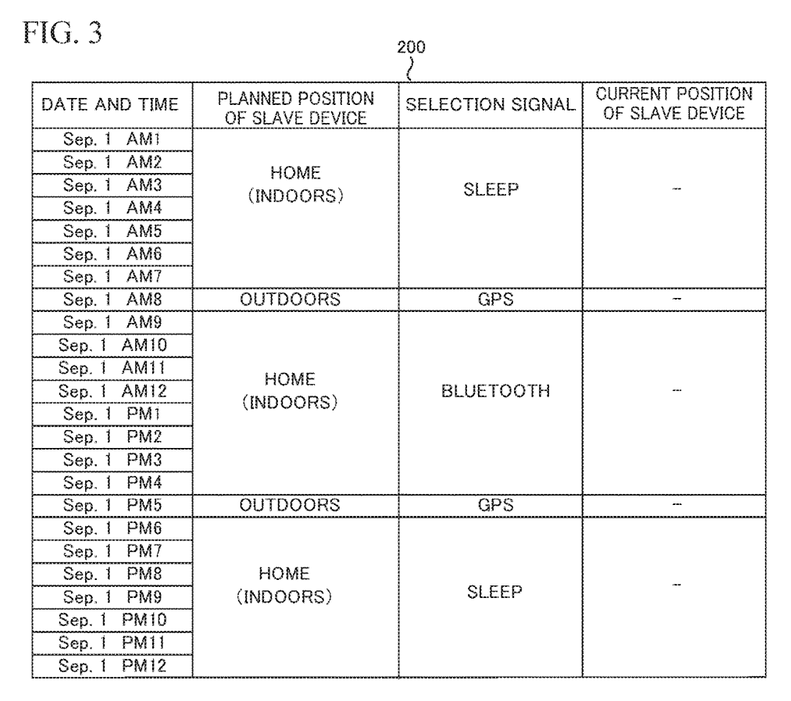
FIG. 3 is a diagram illustrating an example of a database registered in the server.

FIG. 3 is a diagram illustrating an example of a database registered in the server 2. In the FIG. 3, It is assumed that a child has the slave device 4, goes to school from home, and go home from the school, for example.

A database 200 of FIG. 3 stores information indicating a position where the slave device 4 is expected to be located at any time/time zone depending on a behavior pattern of an owner of the slave device 4, and information indicating an acquisition means that is preferably selected in that state. The database 200 is registered in the ROM 23 or the HDD 24 of the server 2. In the database 200, date and time, and a planned position of the slave device 4 in each date and time, a selection signal indicating the acquisition means to be selected, and a current position of the slave device are stored in association with each other. The columns of the date and time, the planned position of the slave device 4 and the selection signal are edited and registered in advance. Here, the date and time is not required to be set as illustrated in FIG. 3, for example, and may be information indicating a range of days of a week and dates rather than a specific date, as well as information indicating a time zone rather than a specific time may be set. Moreover, it is possible to set only the time or time zone and to not set the date. In the following description, the "date and time" includes a case where only the time is set and the date is not set. The column of the current position of the slave device 4 is updated when the server 2 receives information of the current position from the slave device 4.

The selection signal is transmitted from the server 2 to the slave device 4, and is a signal selecting the operation mode or the acquisition means of the slave device 4. The selection signal is "sleep", "GPS", "Bluetooth" or the like. The "sleep" indicates to select the sleep mode as the operation mode of the slave device 4. The "GPS" indicates to select the GPS unit 46 as the acquisition means. The "Bluetooth" indicates to select the Bluetooth unit 45 as the acquisition means.

In FIG. 3, the column of the planned position of the slave device 4 corresponding to 8 a.m. on September 1 is "outdoors". In this example, this time zone is considered to be an attending time for school, and indicates that the child is on the way to school and in the outdoors. Moreover, the date and time of 5:00 p.m. on September 1 is considered to be a time zone of leaving school, and the "outdoors" of the planned position of the slave device 4 corresponding to this date and time indicates that the child is on the way home from school and in the outdoors.

By referring to the database 200, the server 2 can select an optimal acquisition means according to the date and time and the planned position of the slave device 4. When the server 2 begins to communicate with the slave device 4, the server 2 transmits the selection signal corresponding to the communication time with the slave device 4 to the slave device 4 with reference to the database 200.

Figure 4:
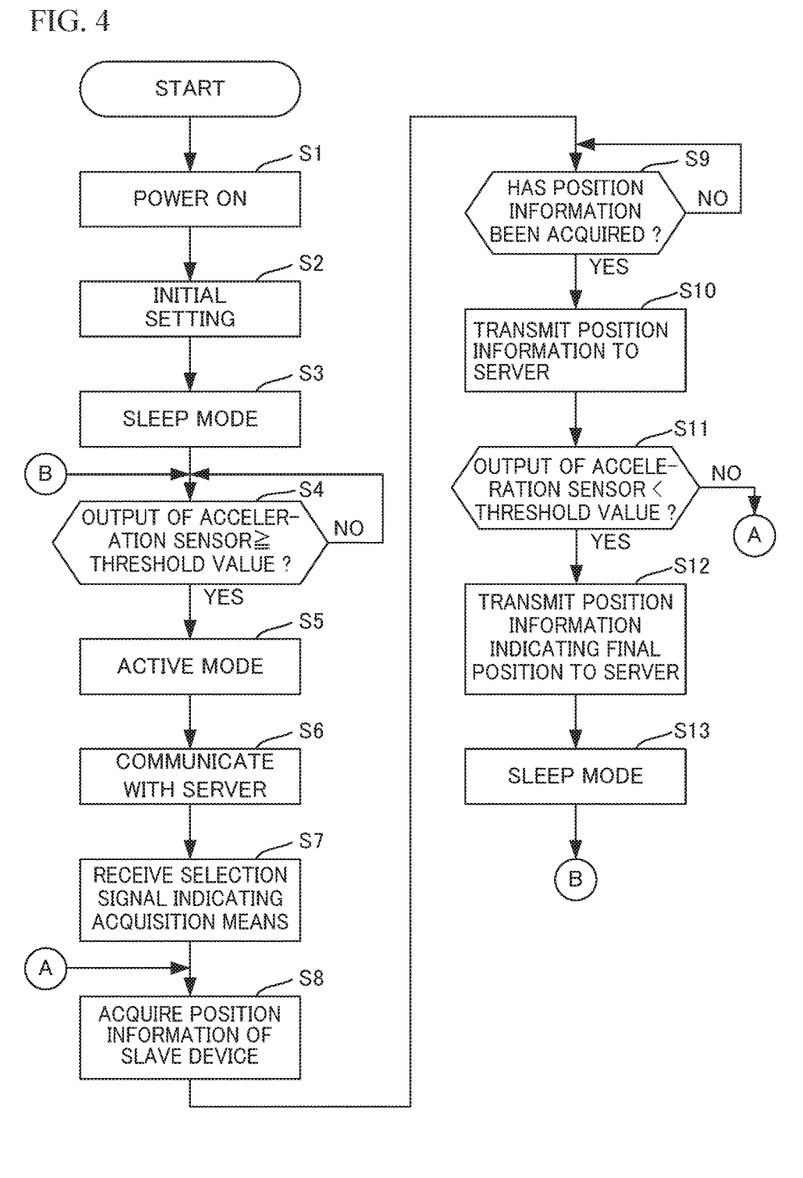
FIG. 4 is a flowchart illustrating processing to be executed by the slave device.

FIG. 4 is a flowchart illustrating processing to be executed by the slave device 4.

When the slave device 4 is powered on (S1), the MCU 41 performs an initial setting (S2). The initial setting is processing that sets a channel of the wireless communicator 44 to the same channel of the wireless communicator 32 of the master device 3, for example. Next, the MCU 41 switches the operation mode to the sleep mode (S3). Here, when the initial setting is the sleep mode, it may not be required to switch the operation mode. Then, the MCU 41 determines whether the output of the acceleration sensor 42 is equal to or more than a threshold value in order to detect whether the slave device 4 has begun to move (S4). When the output of the acceleration sensor 42 is less than the threshold value (NO in S4), the determination of S4 is repeated since the slave device 4 has not begun to move. On the other hand, when the output of the acceleration sensor 42 is equal to or more than the threshold value (YES in S4), the MCU 41 determines that the slave device 4 has begun to move, and switches the operation mode to the active mode (S5). Thereby, the voltage from the battery 43 is supplied to the wireless communicator 44.

The MCU 41 communicates with the server 2 via the wireless communicator 44 and the master device 3 (S6), and receives the selection signal indicating the selected acquisition means (i.e., any one of the Bluetooth unit 45, the GPS unit 46, the IMES unit 47, the UWB unit 48, and the wireless LAN unit 49) (S7). Thereby, the voltage from the battery 43 is supplied to selected one of the Bluetooth unit 45, the GPS unit 46, the IMES unit 47, the UWB unit 48, and the wireless LAN unit 49.

The MCU 41 acquires the position information of the slave device 4 with the use of the acquisition means specified by the selection signal (S8). The MCU 41 determines whether to have acquired the position information of the slave device 4 (S9). When the MCU 41 has not acquired the position information of the slave device 4 (NO in S9), the determination of S9 is repeated. On the other hand, when the MCU 41 has acquired the position information of the slave device 4 (YES in S9), the MCU 41 transmits the acquired position information of the slave device 4 to the server 2 (S10).

Next, the MCU 41 determines whether the output of the acceleration sensor 42 is less than a threshold value for a given period (S11). When the output of the acceleration sensor 42 is equal to or more than the threshold value (NO in S11), the MCU 41 determines that the slave device 4 is moving, and the procedure returns to S8. On the other hand, when the output of the acceleration sensor 42 is less than the threshold value (YES in S11), the MCU 41 determines that the slave device 4 is no longer moving. The MCU 41 transmits the position information indicating a final position of the slave device 4 to the server 2 (S12), and switches the operation mode to the sleep mode (S13). Then, the procedure returns to S4, and the MCU 41 determines whether the slave device 4 has begun to move again.

Thus, when the acceleration sensor 42 detects the movement of the slave device 4, the slave device 4 switches the operation mode to the active mode. Then, the slave device 4 acquires the position information of the slave device 4 with the use of the acquisition means specified by the selection signal received from the server 2, and transmits the position information of the slave device 4 to the server 2. Moreover, when the acceleration sensor 42 is no longer detecting the movement of the slave device 4, the operation mode is switched to the sleep mode.

Figure 5:
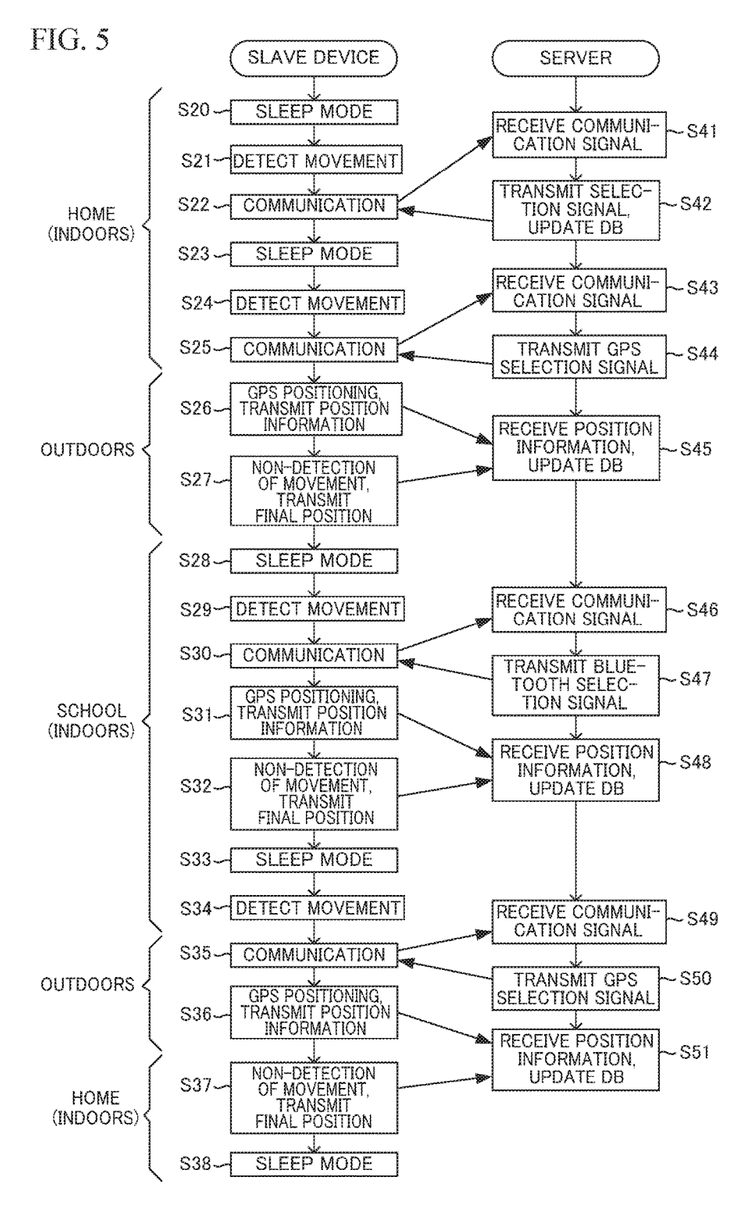
FIG. 5 is a timing chart illustrating processing to be executed by the slave device and the server.
Figure 6A:
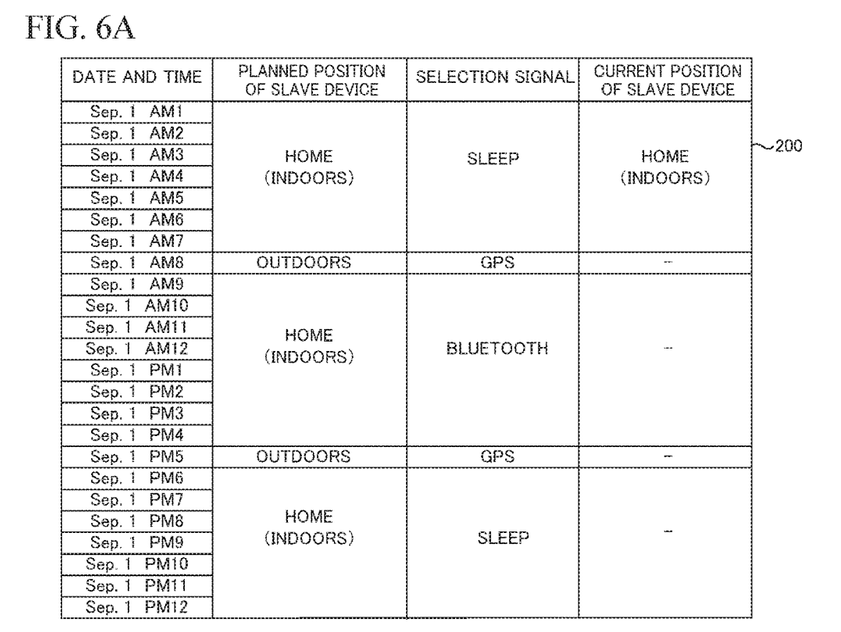
FIGS. 6A and 6B are diagrams illustrating examples of an updated database.
Figure 6B:
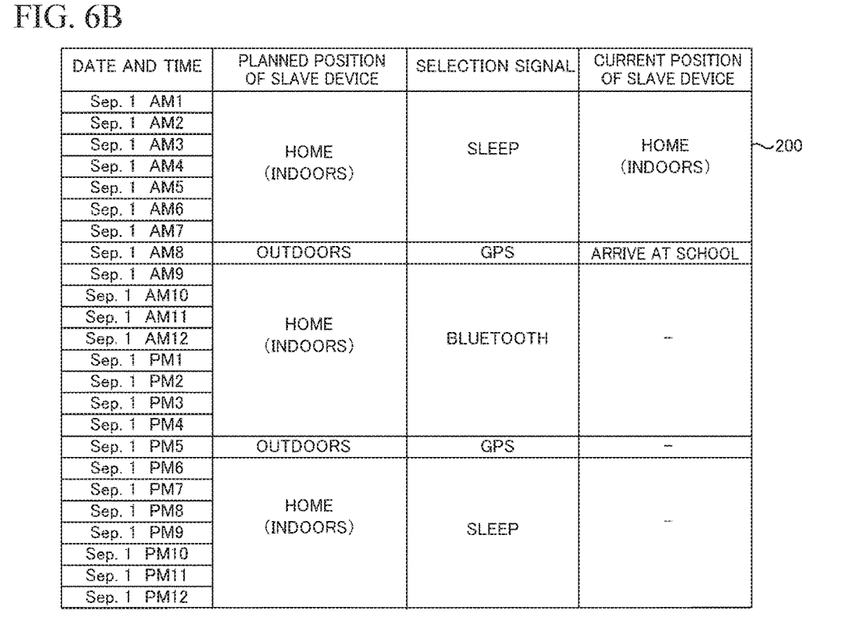

FIG. 5 is a timing chart illustrating processing to be executed by the slave device 4 and the server 2. In FIG. 5, it is assumed that a child has the slave device 4, goes to school from home, and go home from the school. FIGS. 6A and 6B are diagrams illustrating examples of the updated database 200.

The operation mode of the slave device 4 in the initial state is the sleep mode (S20). Here, the slave device 4 is in the indoors. When the acceleration sensor 42 detects the movement of the slave device 4 before the attending time for school (S21), the MCU 41 switches the operation mode to the active mode, and communicates with the server 2 via the wireless communicator 44 and the master device 3 (S22). The CPU 21 of the server 2 receives the communication signal from the slave device 4 via the master device 3 (S41). The CPU 21 transmits the selection signal corresponding to a communication time to the slave device 4 with reference to the database 200, and updates the current position of the slave device 4 in the database 200 based on the received communication signal (S42). Here, the time in which the communication from the slave device 4 is performed is an at-home time when the child is in the home before the attending time for school, and the "sleep" for selecting the sleep mode is set to the column of the selection signal. Therefore, the "sleep" is transmitted from the master device 3 as the selection signal. In S42, the current position of the slave device 4 in the database 200 is updated to "home (indoors)", as illustrated in FIG. 6A. On the other hand, the MCU 41 switches the operation mode of the slave device 4 to the sleep mode based on the received selection signal (S23).

When the acceleration sensor 42 detects the movement of the slave device 4 after the attending time for school (S24), the MCU 41 switches the operation mode to the active mode, and communicates with the server 2 via the wireless communicator 44 and the master device 3 (S25). The CPU 21 of the server 2 receives the communication signal from the slave device 4 via the master device 3 (S43). The CPU 21 transmits the selection signal corresponding to the communication time to the slave device 4 with reference to the database 200 (S44). Here, since the communication time is the attending time for school and the slave device 4 is scheduled to be in the outdoors, the "GPS" that selects the GPS unit 46 as the selection signal is set to the database 200. The MCU 41 acquires the position signal with the use of the GPS unit 46 based on the selection signal received from the server 2, and transmits the position signal to the server 2 (S26). The CPU 21 receives the position information from the slave device 4, and updates the current position of the slave device 4 in the database 200 (S45). When the child arrives at the school and the acceleration sensor 42 does not detect the movement of the slave device 4 for a given period, the MCU 41 transmits the position information indicating the final position of the slave device 4 to the server 2 (S27), and switches the operation mode to the sleep mode (S28). The CPU 21 receives position information indicating the final position from the slave device 4, and updates the current position of the slave device 4 in the database 200 (S45). In this case, it is determined that the child has arrived at the school, and the current position of the slave device 4 in the database 200 is updated to "arrive at school", as illustrated in FIG. 6B.

When the slave device 4 is in the school and the acceleration sensor 42 detects the movement of the slave device 4 before the leaving time (S29), the MCU 41 switches the operation mode to the active mode and communicates with the server 2 via the wireless communicator 44 and the master device 3 (S30). The CPU 21 receives the communication signal from the slave device 4 via the master device 3 (S46). The CPU 21 transmits the selection signal corresponding to the communication time to the slave device 4 based on the database 200 (S47). Here, since the communication time is a class hour and the slave device is scheduled to be in the indoors, the "Bluetooth" that selects the Bluetooth unit 45 as the selection signal is set. The MCU 41 acquires the position information with the use of the Bluetooth unit 45 based on the selection signal received from the server 2, and transmits the acquired position information to the server 2 (S31). The CPU 21 receives the position information from the slave device 4 and updates the current position of the slave device 4 in the database 200 (S48). Then, when the acceleration sensor 42 does not detect the movement of the slave device 4 for a given period, the MCU 41 transmits the position information indicating the final position of the slave device 4 to the server 2 (S32), and switches the operation mode to the sleep mode (S33). The CPU 21 receives the position information indicating the final position from the slave device 4, and updates the current position of the slave device 4 in the database 200 (S48).

When the acceleration sensor 42 detects the movement of the slave device 4 at the leaving time (S34), the MCU 41 determines that the slave device 4 has begun to move, switches the operation mode to the active mode, and communicates with the server 2 via the wireless communicator 44 and the master device 3 (S35). The CPU 21 receives the communication signal from the slave device 4 via the master device 3 (S49). The CPU 21 transmits the selection signal corresponding to the communication time to the slave device 4 with reference to the database 200 (S50). Here, since the communication time is the leaving time and the slave device 4 is scheduled to be in the outdoors, the "GPS" that selects the GPS unit 46 as the selection signal is set. The MCU 41 acquires the position information with the use of the GPS unit 46 based on the selection signal received from the server 2, and transmits the position information to the server 2 (S36). The CPU 21 receives the position information from the slave device 4, and updates the current position of the slave device 4 in the database 200 (S51). When the child arrives at the home and the acceleration sensor 42 does not detect the movement of the slave device 4 for a given period, the MCU 41 transmits the position information indicating the final position of the slave device 4 to the server 2 (S37), and switches the operation mode to the sleep mode (S38). The CPU 21 receives the position information indicating the final position from the slave device 4, and updates the current position of the slave device 4 in the database 200 (S51).

In FIG. 5, it is assumed that the slave device 4 is present in a predetermined place at a predetermined time. Therefore, the slave device 4 can acquire the position information with the use of the acquisition means specified by the selection signal. However, when the slave device 4 is not present in the predetermined place at the predetermined time, the slave device 4 may not be able to acquire the position information with the use of the acquisition means specified by the selection signal. For example, when the slave device 4 is in the school (indoors), the MCU 41 can acquire the position information with the use of the Bluetooth unit 45 but might not receive the GPS signal indoor. On the other hand, when the slave device 4 is in the outdoors by off-campus learning, the MCU 41 cannot acquire the position information with the use of the Bluetooth unit 45 but can acquire the position information with the use of the GPS.

Hereinafter, a description will be given of processing to be executed by the slave device 4 and the server 2 when the slave device 4 cannot acquire the position information with the use of the acquisition means specified by the selection signal, with reference to FIG. 7.

Figure 7:
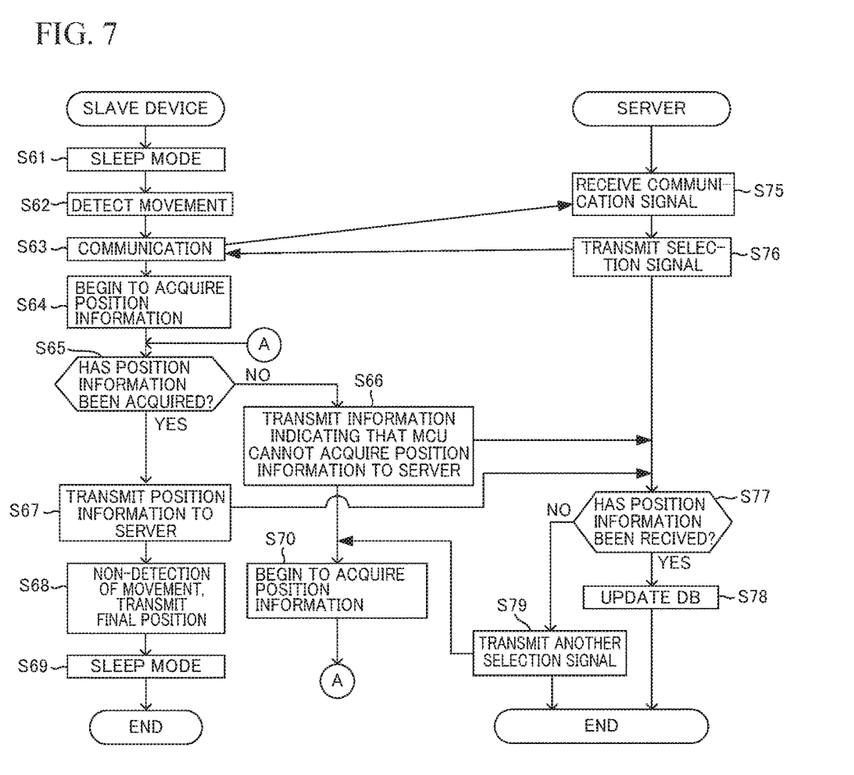
FIG. 7 is a timing chart illustrating processing to be executed by the slave device and the server.

FIG. 7 is a timing chart illustrating processing to be executed by the slave device 4 and the server 2.

In the initial state, the operation mode of the slave device 4 is the sleep mode (S61). When the acceleration sensor 42 detects the movement of the slave device 4 (S62), the MCU 41 switches the operation mode to the active mode, and communicates with the server 2 via the wireless communicator 44 and the master device 3 (S63).

The CPU 21 receives the communication signal from the slave device 4 via the master device 3 (S75). The CPU 21 transmits the selection signal corresponding to the communication time to the slave device 4 with reference to the database 200 (S76). When the communication time is the class hour, the "Bluetooth" that selects the Bluetooth unit 45 is transmitted to the slave device 4 as the selection signal.

The MCU 41 begins to acquire the position information with the use of the Bluetooth unit 45 based on the received selection signal (S64). After S64, the MCU 41 determines whether to have acquired the position information (S65). When the MCU 41 has not acquired the position information (NO in S65), the MCU 41 transmits to the server 2 information indicating that the MCU 41 cannot acquire the position information (S66). When the MCU 41 has acquired the position information (YES in S65), the MCU 41 transmits the position information to the server 2 (S67).

On the other hand, the CPU 21 monitors the signal from the slave device 4 at any time, and determines whether to have received the position information from the slave device 4 (S77). When the CPU 21 has received the position information from the slave device 4 (YES in S77), the CPU 21 updates the current position of the slave device 4 in the database 200 (S78). On the other hand, when the CPU 21 has not received the position information from the slave device 4, i.e., has received the information indicating that the MCU 41 cannot acquire the position information (NO in S77), the CPU 21 transmits to the slave device 4 another selection signal that selects another acquisition means, e.g. the "GPS" that selects the GPS unit 46 (S79).

After S67, when the acceleration sensor 42 does not detect the movement of the slave device 4 for a given period, the MCU 41 determines that the movement of the slave device 4 is stopped, transmits the position information indicating the final position of the slave device 4 to the server 2 (S68), and switches the operation mode to the sleep mode (S69). On the other hand, when the MCU 41 cannot acquire the position information at S65, the MCU 41 begins to acquire the position information with the use of the GPS unit 46 in accordance with the another selection signal received from the server 2 after S66 (S70), and the procedure returns to S65.

Thus, when the MCU 41 cannot acquire the position information with the use of the acquisition means specified from the server 2, the MCU 41 transmits to the server 2 the information indicating that the MCU 41 cannot acquire the position information (S66), and begins to acquire the position information with the use of the another acquisition means specified by the selection signal transmitted from the server 2 (S79, S70). Therefore, even when the slave device 4 is not present in the predetermined place at the predetermined time, the slave device 4 can acquire the position information.

Figure 8:
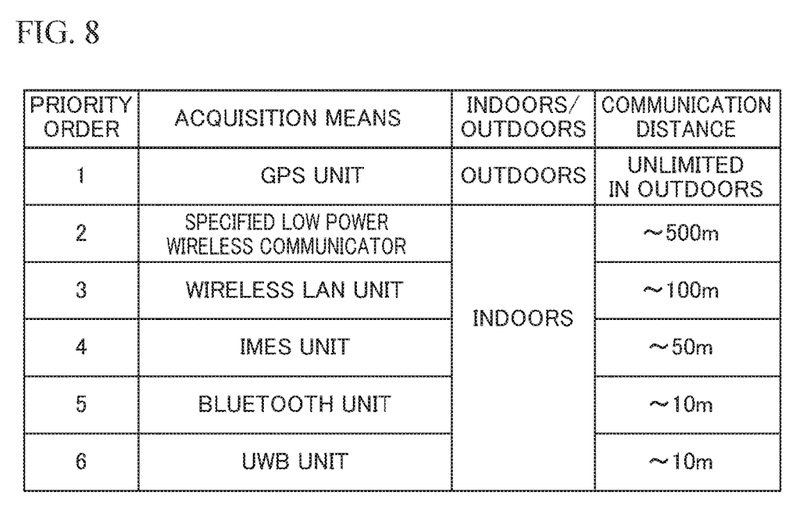
FIG. 8 is a diagram illustrating a priority order and a specification of an acquisition means.

FIG. 8 is a diagram illustrating a priority order and a specification of the acquisition means.

When the MCU 41 cannot acquire the position information with the acquisition means specified from the server 2, the CPU 21 of the server 2 selects the acquisition means in the priority order illustrated in FIG. 8 and transmits the selection signal to the slave device 4. In an example of FIG. 8, the MCU 41 first selects the GPS unit 46 as a first acquisition means that can acquire the position information of the slave device 4 outdoor. Next, when the slave device 4 cannot acquire the position information with the use of the GPS unit 46, the MCU 41 may select the acquisition means in an order of the wireless communicator 44, the wireless LAN unit 49, the IMES unit 47, the Bluetooth unit 45 and the UWB unit 48, as a second acquisition means that acquires the position information of the slave device 4 indoor in accordance with a long order of a communication distance, and may transmit a corresponding selection signal to the slave device 4. Thereby, since the position information in the outdoors is first acquired preferentially and then the acquisition means is selected in the long order of the communication distance, the slave device 4 can efficiently acquire the position information, which make it possible to suppress the power consumption of the slave device 4.

As described above, according to the present embodiment, when detecting the movement of the slave device 4, the slave device 4 switches the operation mode to the active mode, acquires the position information with the use of the acquisition means specified by the selection signal for selecting one of the plural acquisition means transmitted from the server 2, and transmits the acquired position information to the server 2. Moreover, when detecting that the movement of the slave device 4 is stopped, the slave device 4 switches the operation mode to the sleep mode. Therefore, it is possible to suppress the power consumption of the slave device 4 and acquire the position information in an optimal manner.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A communication device communicatable with an information processing device, comprising:
   a communicator that communicates with the information processing device;
   a detector that detects the movement of the communication device;
   an acquirer that acquires position information of the communication device by using one of different communication methods; and
   a selector that selects a communication method in which the acquirer acquires the position information, based on a selection signal transmitted from the information processing device;
   wherein when the detector detects the movement of the communication device, the communicator communicates with the information processing device, and the acquirer acquires the position information of the communication device by using the communication method selected by the selector.

2. A communication device communicatable with an information processing device, comprising:
   a communicator that communicates with the information processing device;
   a detector that detects the movement of the communication device;
   a plurality of acquirers that acquire position information of the communication device by using different communication methods;
   a selector that selects one of the acquirers acquiring the position information in accordance with a selection signal transmitted from the information processing device;
   a processor that sets one of a first mode and a second mode as an operation mode, the second mode being less in power consumption than the first mode;
   wherein when the detector detects the movement of the communication device, the processor sets the operation mode to the first mode, the communicator communicates with the information processing device, the selector selects one of the acquirers acquiring the position information in accordance with the selection signal transmitted from the information processing device, and a selected acquirer acquires the position information of the communication device, and
   when the detector detects no movement of the communication device, the processor sets the operation mode to the second mode.

3. The communication device as claimed in claim 2, wherein
   the plurality of acquirers include a first acquirer that acquires the position information of the communication device in the outdoors, and a second acquirer that acquires the position information of the communication device in the indoors,
   when one of the acquirers selected by the selector does not acquire the position information of the communication device, the information processing device transmits to the communication device the selection signal that preferentially selects the first acquirer and then selects the second acquirer according to a long order of a communication distance.

4. A communication system including an information processing device and a communication device, comprising:
   the communication device including:
   a communicator that communicates with the information processing device;
   a detector that detects the movement of the communication device;
   a plurality of acquirers that acquire position information of the communication device by using different communication methods;
   a selector that selects one of the acquirers in accordance with a selection signal transmitted from the information processing device;
   the information processing device including:
   a database that stores at least a date and time, a planned position of the communication device and an acquirer associated with each other;
   a transmitter that transmits to the communication device the selection signal that selects the one of the acquirers based on a communication date and time with the communication device and the date and time stored in the database;
   wherein the detector detects the movement of the communication device, the communicator communicates with the information processing device, the selector selects the one of the acquirers in accordance with the selection signal transmitted from the information processing device, and a selected acquirer acquires the position information of the communication device.

5. The communication system as claimed in claim 4, wherein
  when the one of the acquirers selected by the selector acquires the position information of the communication device, the communicator transmits the position information of the communication device to the information processing device;
  when the one of the acquirers selected by the selector does not acquire the position information of the communication device, the selector transmits to the information processing device information indicating that the one of the acquirers cannot acquire the position information of the communication device, the transmitter transmits to the communication device a signal that selects another acquirer different from the one of the acquirers, and the selector selects the another acquirer.

* * * * *